(12) United States Patent
Train

(10) Patent No.: US 6,689,279 B1
(45) Date of Patent: Feb. 10, 2004

(54) DEVICE FOR SEPARATING AND DISPENSING HIGH VISCOSITY FLUID FROM LOW VISCOSITY FLUIDS

(76) Inventor: Elizabeth F. Train, 22 Mill St., N. Patchogue, NY (US) 11772

( * ) Notice: Subject to any disclaimer, the term of this patent is extended or adjusted under 35 U.S.C. 154(b) by 0 days.

(21) Appl. No.: 09/654,886

(22) Filed: Sep. 5, 2000

(51) Int. Cl.$^7$ ............................................... B01D 17/02
(52) U.S. Cl. ...................... 210/800; 210/801; 210/514; 210/515; 222/1; 222/567; 222/572; 99/496
(58) Field of Search ................................ 210/514, 515, 210/800, 801; 222/1, 566, 567, 572; 99/495–496

(56) References Cited

U.S. PATENT DOCUMENTS

| | | | | |
|---|---|---|---|---|
| 315,448 A | * | 4/1885 | Stoddard | 210/175 |
| 1,488,865 A | * | 4/1924 | Castor | 210/514 |
| 1,811,113 A | * | 6/1931 | Derby | 210/515 |
| 1,865,023 A | * | 6/1932 | Leavy | 215/227 |
| 2,075,665 A | * | 3/1937 | Sheemaeker | 215/6 |
| 2,222,594 A | * | 11/1940 | Metcalf | 210/514 |
| 2,428,429 A | * | 10/1947 | McNeil | 210/514 |
| 2,544,070 A | * | 3/1951 | Daniels | 210/514 |
| 3,257,170 A | * | 6/1966 | Marcus et al. | 422/101 |
| 3,713,778 A | * | 1/1973 | Karamian | 422/101 |
| 4,148,417 A | * | 4/1979 | Simmons | 222/94 |
| 4,193,513 A | * | 3/1980 | Bull, Jr. | 222/1 |
| 4,251,032 A | * | 2/1981 | Werding | 239/323 |
| 4,384,960 A | * | 5/1983 | Polley | 210/753 |
| 4,408,702 A | * | 10/1983 | Horvath | 222/212 |
| 4,523,934 A | * | 6/1985 | Joshua | 96/193 |
| 4,535,918 A | * | 8/1985 | Heiligman et al. | 222/209 |
| 4,611,715 A | * | 9/1986 | Redmond | 206/484 |
| 4,640,185 A | * | 2/1987 | Joyner | 99/495 |
| 4,934,420 A | * | 6/1990 | Radna | 141/340 |
| 4,946,075 A | * | 8/1990 | Lundback | 222/181.3 |
| 5,033,653 A | * | 7/1991 | Kaufman | 222/185.1 |
| 5,037,005 A | * | 8/1991 | Appleby et al. | 222/184 |
| 5,115,946 A | * | 5/1992 | Libit | 222/145.7 |
| 5,145,094 A | * | 9/1992 | Perlmutter | 222/153.14 |
| 5,152,432 A | * | 10/1992 | De Laforcade | 222/145.1 |
| 5,310,091 A | * | 5/1994 | Dunning et al. | 222/135 |
| 5,353,965 A | * | 10/1994 | Lee | 222/143 |
| 5,356,638 A | * | 10/1994 | Varan | 210/514 |
| 5,417,860 A | * | 5/1995 | Kay | 210/472 |
| 5,435,463 A | * | 7/1995 | Hodgson | 222/105 |
| 5,437,396 A | * | 8/1995 | Russillo et al. | 222/185.1 |
| 5,472,123 A | * | 12/1995 | Jangaard | 222/212 |
| 5,509,579 A | * | 4/1996 | Robbins, III | 222/109 |
| 5,516,007 A | * | 5/1996 | Larson | 222/105 |
| 5,567,308 A | * | 10/1996 | Visser | 210/232 |
| 5,609,759 A | * | 3/1997 | Nohren et al. | 210/266 |
| 5,616,242 A | * | 4/1997 | Mandola | 210/238 |
| 5,632,420 A | * | 5/1997 | Lohrman et al. | 222/212 |
| 5,667,107 A | * | 9/1997 | Lindsey | 222/173 |
| 5,697,526 A | * | 12/1997 | Lee | 222/113 |
| 5,720,416 A | * | 2/1998 | Izoe | 222/138 |
| 5,914,045 A | * | 6/1999 | Palmer et al. | 210/694 |
| 5,928,512 A | * | 7/1999 | Hatch et al. | 210/266 |
| 6,153,096 A | * | 11/2000 | Nonren, Jr. | 210/238 |
| 6,165,362 A | * | 12/2000 | Nohren et al. | 210/266 |
| 6,193,886 B1 | * | 2/2001 | Nohren, Jr. | 210/282 |
| 6,293,437 B1 | * | 9/2001 | Socier et al. | 222/212 |
| 6,315,160 B1 | * | 11/2001 | Gaiser et al. | 222/1 |

* cited by examiner

Primary Examiner—Robert J. Popovics

(57) ABSTRACT

A device used in separating flowing substances and can be placed inside the top of a dispenser. The device separates high viscosity liquid from a low viscosity liquid. The device is comprised of a smooth conical funnel piece inverted into the dispenser containing the substance. The top of the device is flat and the top rim of the device extends horizontal across the dispenser's neck opening. Rim of the device may be adjusted for size by applying pressure at a break point and snap off excess in the flat portion of the device's rim. Device can be separately manufactured or molded with the container as part of the dispenser's top aperture. It can also be molded with the dispensers cover. When the container is inverted, the lighter weight viscosity liquid is retained in the area around the inverted nozzle of the device. The thicker high viscosity liquid can now be discharged from the opening of the dispenser by applying pressure. High viscosity fluid will flow through the aperture of the device and into and out of the cover opening of the dispenser.

8 Claims, 4 Drawing Sheets

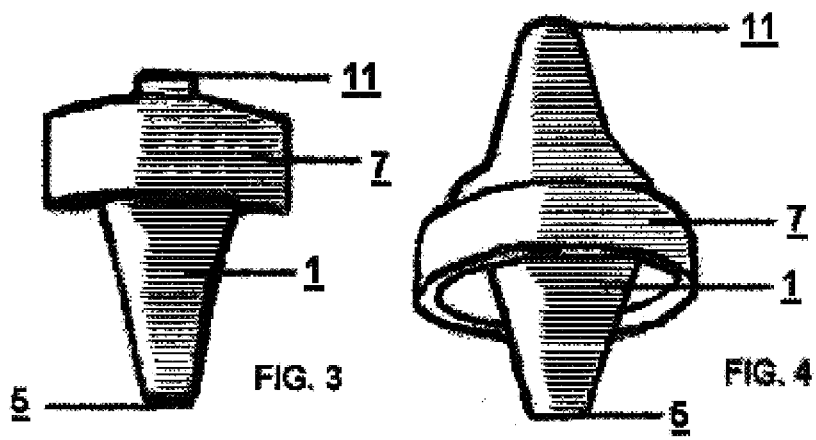
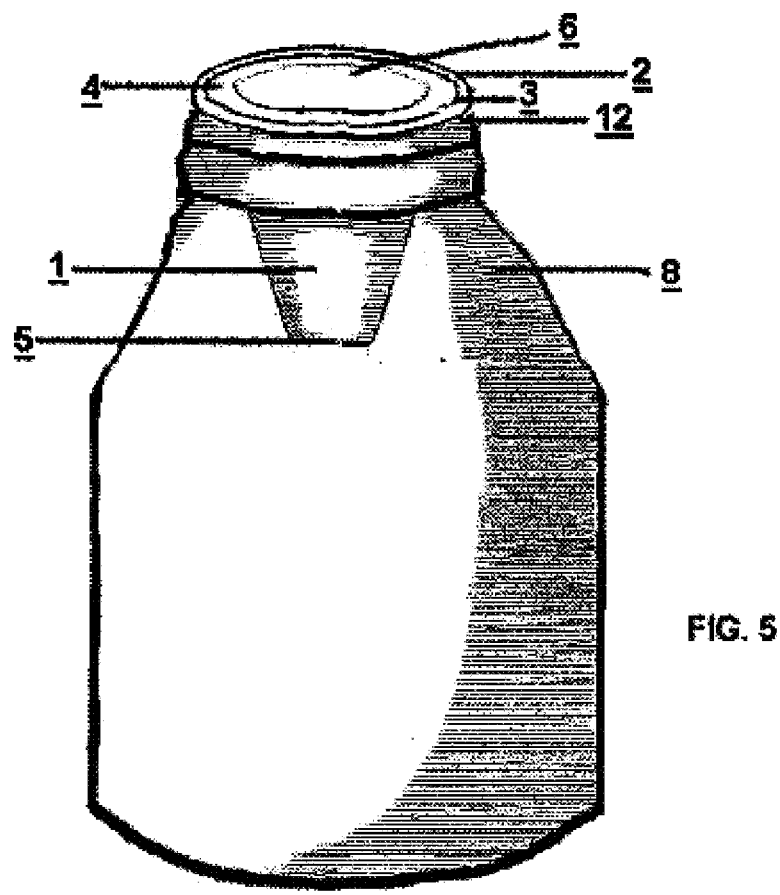

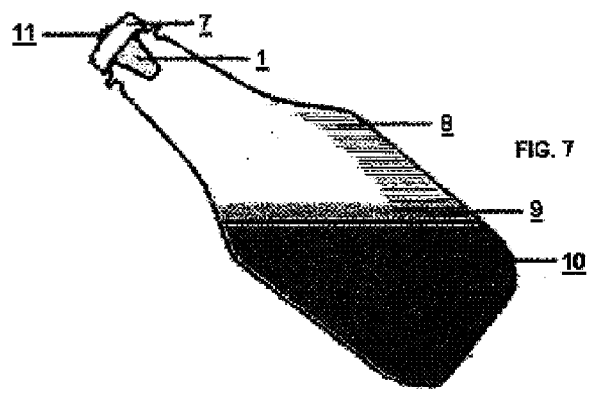
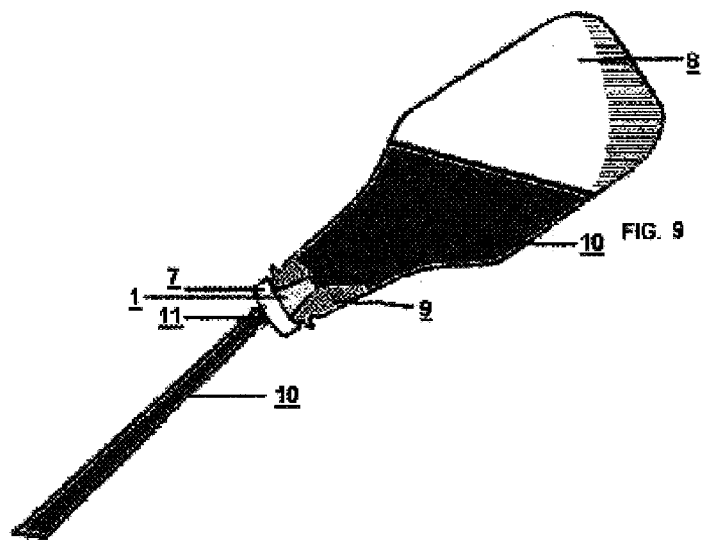
FIG. 6
FIG. 7
FIG. 8
FIG. 9

DEVICE FOR SEPARATING AND DISPENSING HIGH VISCOSITY FLUID FROM LOW VISCOSITY FLUIDS

CROSS-REFERENCE TO RELATED APPLICATIONS

U.S. Class: 222/1;222/94;222/105;222/113;222/138;222/143;222/145; 222/153;222/173;222/181;222/184;222/185;222/185.1

Intern'l Class:

Field of Search: 99/495, 141/106,141/340,206/484,422/101 222/1,94,105,113,132,138,143,145,153, 173,181, 184,185,185.1,211,212,640

| U.S. Patent Documents | | | |
|---|---|---|---|
| 315,448 | April 1885 | Stoddard | 210/175 |
| 3,257,170 | June 1966 | Marcus et al | 422/101 |
| 3,713,778 | January 1973 | Karamian | 422/101 |
| 4,148,417 | April 1979 | Simmons | 222/94 |
| 4,193,513 | March 1980 | Bull, Jr. | 222/1 |
| 4,408,702 | October 1983 | Horvath | 222/212 |
| 4,535,918 | August 1985 | Heiligman | 222/185 |
| 4,611,715 | September 1986 | Redmond | 206/484 |
| 4,640,185 | February 1987 | Joyner | 99/495 |
| 4,934,420 | June 1990 | Radna | 141/340 |
| 4,946,075 | August 1990 | Lundback | 222/181 |
| 5,033,653 | July 1991 | Kaufman | 222/185 |
| 5,037,005 | August 1991 | Appleby, et al | 222/184 |
| 5,115,946 | May 1992 | Libit | 222/145 |
| 5,145,094 | September 1992 | Perlmutter | 222/153 |
| 5,353,965 | October 1994 | Lee | 222/143 |
| 5,435,463 | July 1995 | Hodgson | 222/105 |
| 5,437,396 | August 1995 | Russillo et al. | 222/185.1 |
| 5,472,123 | December 1995 | Jangaard | 222/212 |
| 5,516,007 | May 1996 | Larson | 222/105 |
| 5,667,107 | September 1997 | Lindsey | 222/173 |
| 5,697,526 | December 1997 | Lee | 222/113 |
| 5,720,416 | February 1998 | Izoe | 222/138 |

STATEMENT REGARDING FEDERALLY SPONSORED RESEARCH OR DEVELOPMENT

"Not Applicable"

REFERENCE TO A MICROFICHE APPENDIX

"Not Applicable"

BACKGROUND OF THE INVENTION

FIELD OF INVENTION

The invention relates to separating the lower viscosity fluid from the heavier high viscosity fluid in a dispenser blocking the lighter weight viscosity fluid from exiting the dispenser. When applying pressure to the dispenser, the high viscosity fluid is forced through the lower aperture of the inverted conical device leaving behind the lower viscosity fluid in the dispenser. Subsequently, the heavier high viscosity fluid is pushed through the device and expels out of the top opening aperture of the cover of the dispenser. The dispenser cover can be flat, conical, round or any variety of functional shape.

Anyone who has dispensed ketchup or mustard from a plastic squeeze container and has had a watery substance flow out and onto the bun or bread would appreciate the value of this device. While stored in a refrigerator, these products separate and collect an undesirable fluid on top of the desired product. Subsequently, the undesirable product is released first when the container is squeezed. Our device will eliminate this problem by allowing smooth flow of product thus expelling unrestricted flow of desirable product.

At the present time Heinz has a product that is similar but fails to continue to provide product separation. Product collects in the cover thus clogging the area for lower viscosity storage. Product separates in the cover but fails after a couple of uses.

There have been many attempts to correct the problem of dispensing smooth flowing substances by extracting the fluid from the bottom of the dispenser or storing the container inverted. Bottom extraction of product may drip or leak from the outlet and is difficult to use. Leaving the dispenser inverted can produce a way to extract a premium product and eliminate squirting and spitting of substance but it can have the same problem with leakage. Storage of inverted containers can be cumbersome and top heavy.

Dispenser valves are expensive and functionality can present a problem. Sanitary conditions may be a concern due to fluids being trapped. Fluids that collect and clog the valve continuously coat valves and tubes. Any added device springs, disc closures, valves, squeeze bulbs, screens, pumps, or flexible pouch, etc. that are not smooth and without ridges, may retain product and clog or become unsanitary. Compression chambers and air relief openings while in theory may work, may clog and stop functioning. Our device will allow a smooth flow through the bottom of the device and without restriction through the opening of the top cover of the dispenser allowing even flow of product. The aperture opening of the cover may be the same size as the bottom aperture of the device but can vary.

Manually operated closure members that separate do no offer the same convenience or economic advantage. In addition, closure mechanisms can become clogged or frozen thus initiating possible contamination. This device has not moving parts and will help to eliminate problems of mechanical failure.

There have been proposals to extend a tube to the bottom of the dispenser. Retrieval of fluids from the bottom of the container will leave a residual amount of fluid in the tube that may collect and clog the tube. Additionally, all the substance may not be withdrawn from the dispenser resulting in loss of product. The device will not have these problems because the opening is adequate to allow residual fluid to be gravity feed back to the dispenser.

U.S. Pat. No. 315,448 Stoddard. He discloses a milk settling apparatus that has an inner tube to separate fluids. Different concept of separation of type of fluids and inner tube used.

U.S. Pat. No. 3,257,170 Marcus, et al. The device discloses a liquid separator apparatus in which an upper container has a lower opening that forms a fluid-tight seal. A stopcock is provided in the funnel and has a separate tube between the stopcock and interior of the container to supply air to the interior of the container. Separate tube can create buildup of product and spoilage U.S. Pat. No. 3,713,778 Karamian. This apparatus has an inner tube and a glass pane where separation level can be viewed at the top of the inner tube. Separate tube and breakage of glass may be a cause for concern.

U.S. Pat. No. 4,148,417—Simmons, Michael J. Fluid dispenser molded plastic material into plural compartments to improve squeeze-dispersing function. Manufactured with plural compartments and does not separate fluids.

U.S. Pat. No. 4,193,513—Bull, Jr.—Employs a combination of spring and sponge power to dispense fluids and semi-solids from a container. Use of plastic bags and springs will be difficult to implement. Not costs effective and sanitary concern.

U.S. Pat. No. 4,408,702—Horvath, William—Automatic dispenser cap. Allows product to flow upon application of manual squeeze pressure. Two valve head with an upper disc closure. Disc closure would be unreliable and development is a problem.

U.S. Pat. No. 4,535,918—Heiligman, Randy B. Squeeze bulb actuator needs a spring lever actuated by the air squeeze bulb so that the lever opens the spout. Difficult to manufacture and valves buildup with accumulation of substance.

U.S. Pat. No. 4,611,715 Redmond, Sanford. He developed a flexible pouch adhered to a stiff sheet material which is opened along a fault line or pattern. Behind the fault line connecting two laterally spaced pockets located on either side of the fault pattern to eliminate squirting or spitting of the flow able product upon rupture of the fault line. Not reusable and use of pouch is not sanitary due to substance accumulating. Difficult to develop.

U.S. Pat. No. 4,640,185 Joyner, Auvin H. Funnel stock/sauce separator. Separating fat from liquid is provided and consists of a funnel with a closure member positioned within the funnel over a spout for controlling outflow of the liquid. Manual operated closure member could malfunction and residual substance may become unsanitary.

U.S. Pat. No. 4,934,420 Radna, Rachel. Gravy separating device. Conduit extending down to the lower most part of the container. Usage of a screen filter and conduit extending down to the lowermost section of dispenser can trap product. Not economical and unsanitary.

U.S. Pat. No. 4,946,075 Lund back, Rune. This device shows a dispensing device for flowing substances that attaches to a container with an outlet tube. Furthermore, the device comprises a valve arrangement comprising of two valve members and can retrieve high viscosity fluids from bottom. Valves may become clogged and sanitary concern to the consumer.

U.S. Pat. No. 5,033,653—Kaufman, John. Dispenser with compression chamber—temperature control and air relief to minimize the risk of temperature driven dispensing. Invention includes levels, air relief opening and a reservoir. Device is complicated and hard to implement.

U.S. Pat. No. 5,037,005—Appleby, et al.—Valve dispensing outlet located on a lower side face of the container. Leakage may occur and causes concerns with sanitary conditions.

U.S. Pat. No. 5,115,946—Libit. Squeeze bottle that eliminates a separate tube and has no moving parts. The supply tube extends from the bottom of the container and it is not necessary to shake before using. Tubes would be difficult to use due to high viscosity fluid leaves a residual deposit that could cause dispenser to clog.

U.S. Pat. No. 5,145,094—Permutter, Thom M. Dispensing closure for squeeze bottle—Moveable closure body has an open position and a closed position. Controls the flow but does not separate fluids. Valves can stick and are not economical.

U.S. Pat. No. 5,353,965—Lee, Gary K. Device needs inverted position for dispensing. Cap has to be removed and replaced with a nozzle. Bottle needs to be inverted and cap needs to be removed and replaced by a nozzle.

U.S. Pat. No. 5,435,463 Hodgson, Dale A. Invention has a condiment dispenser that has a pump-actuating member. Also, consists of a collapsible condiment bag. Moving parts may be hard to implement and expensive to utilize. Condiment bag can trap product and allow spoilage.

U.S. Pat. No. 5,437,396 Russell, Rhonda L. Dispenser apparatus—A push valve extends inside of the chamber through the bottom of the chamber. Chambers and valves may cause product to be trapped.

U.S. Pat. No. 5,472, 123—Vanguard, Stephen S. Valve system that prevents fluids from flowing out of the neck until a user squeezes the base of the bottle. Flap valves could cause possible failure.

U.S. Pat. No. 5,516,007—Larson. Includes chamber and flexible bag containing flow materials. Invention may be difficult to develop and expensive to utilize.

U.S. Pat. No. 5,667,107—Lindsay, William J. Device has a bottom outlet for dispensing viscous fluids. Automatic dispensing valve and must be located with nozzle down. Needs a stand and has to be inverted.

U.S. Pat. No. 5,697,526—Lee. Dispensing units for liquids. With dispenser in inverted position you need to use a push rod with two spaced apart arms. Rollers push fluids towards cover of dispenser. Not cost effective to implement.

U.S. Pat. No. 5,720,416—Izoe. A device that dispenses viscous liquids and that has a hollow cylindrical body and rotating vanes. Vanes may leave residual product for sanitary concern and expensive to implement.

BRIEF SUMMARY OF THE INVENTION

The object of this invention is to provide a way to improve the consistency of product that is dispensed. In dispensing condiments such as catsup or mustard, you can block the flow of the low weight viscosity fluid (water) inside the dispenser and the high viscosity more desirable product (catsup or mustard), can be expelled. The invention can be use for any fluid that separates and where there is a need to extract the separated high viscosity fluid. The expression of "Liquids", "Fluids" or "Product" as stated would consist of liquid to semi solid substances.

This device is inverted into the dispenser with the larger circumference of the device resting on the top rim of the dispenser. The smaller circumference is inserted into the dispenser and points downward towards the bottom The cover is then repositioned on the dispenser and tightened.

Present attempts by Heinz Corporation using a new cover on their ketchup bottle to separate and eliminate dispensing of undesirable product fails. After the first use, product collects in cover area and negates any future separation of product rendering Heinz Corporation design useless. Our device does not allow product to collect due to conical smooth surface, device length and gravity flow that allows product to return back to dispenser. Aperture is larger and device extends further into the dispenser thus leaving a large area for retaining low viscosity fluid.

This device is a method of retrieval of high viscosity fluid and is accomplished when dispenser is squeezed. In using this device while inverting a ketchup bottle, gravity will allow the lower weight viscosity fluid (water) to move down towards the dispensers cover first and retain the low viscosity fluid between the device and the dispenser wall. The low viscosity fluid will flow before the high viscosity product. The low viscosity fluid (water substance) is retained in the area around the conical shaped device and does not get released from the dispenser. When the dispenser is squeezed, the thicker high viscosity product (ketchup) is forced through the device and released from the cover of the dispenser. Device will not clog because conical shape will be of a sufficient size. Prior art with small tubes cause clogging due to residue left on tubing. Prior art dispensers that separator require inverted containers or retrieval of substance from the bottom of the dispenser can clog or become top heavy.

Previous dispenser technology that involved valves and slide openings that may be subject to clogging and malfunction. The cost of our device is negligible. Most prior art patents that describe valves and compartments, etc., may be difficult to implement and may also trap product that can cause unsanitary conditions. The use and development of these inventions are not cost effective.

This device opening has a large aperture to allow gravity to flow product back to the dispenser. Implementing usage of this device in existing products on the market would be inexpensive. It will help the consumer in a variety of products. Device has no moving parts and is virtually indestructible.

Prior art that describe the usage of tubes that extend to the bottom of the dispenser are not a consideration due to the small openings that can result in deposits of residual liquid in the outlet. This residual liquid may become contaminated after extended use.

You can insert the conical shaped device into the top of a bottle as a separate piece, manufactured as part of the rim of the dispenser or incorporated into the cover of the dispenser.

The conical shaped device has a smaller aperture that fits into the top of a dispenser. This device will completely cover the top opening of the dispenser. The device can be made of the same material as the dispenser as long as it retains it shape when the dispenser is squeezed. If the dispenser is manufactured with a substance that is too pliable then the device must be produced with a heavier material, as needed.

Due to the influence of gravity, when the dispenser is inverted, the low viscosity fluid moves down towards the cover before the high viscosity fluid. The low viscosity fluid retains in the space between the inverted funnel device and the neck of the squeeze dispenser. At this time, the high viscosity fluid will be pushed through the device and thus expel out of the top of the dispenser. As with prior art, the dispenser does not need to be stored in an inverted position. Separation will occur at the time the dispenser is used to expel desirable fluids.

BRIEF DESCRIPTION OF THE SEVERAL VIEWS OF THE DRAWINGS

FIG. 1 shows the parts of the device top opening aperture 6, bottom aperture opening 5, outer rim 2, inner snap away line 3, (not limited to one snap away section) and section 4 which is remaining top section of the Device 1.

FIG. 3 is a vertical perspective representation view of the device 1, according to the invention positioned inside a flat top dispenser cover 7. Cover 7 and device 1 can be molded separately or manufactured together as shown in FIG. 4.

FIG. 4 is a vertical perspective representation view of the device 1 inserted inside a dispenser 8 with a conical shaped cover 7. According to the invention, the cover 7, including device 1 inserted into the top rim 12 is placed on the dispenser 8 and tightened.

FIG. 5 is a vertical perspective representation view of the device 1, according to the invention in a dispenser 8. The device 1 is inserted in the top opening of the dispenser 8 with the smaller aperture 5 pointing down to the bottom of the dispenser 8.

FIGS. 6, 7, 8 and 9, the device 1 is inverted and desirable product in expelled as in FIG. 9. Rotation of the dispenser 8 shows the separation of fluids 9 from fluid 10 thus expelling fluid 10.

FIG. 6 is a dispenser 8 in a vertical perspective view with components in position.

FIG. 7 is the embodiment of the device 1 in the dispenser 8 at the beginning of rotation of the operational view.

FIG. 8 is an example of a dispenser including a device 1 at a horizontal position of the operational view half way through its rotation.

FIG. 9 is showing the separation of fluids with the low viscosity fluids 9 being blocked from expelling and the high viscosity fluids 10 being squeezed from the dispenser and released. Representation illustrates a typical dispenser 8 utilizing the device 1 to separate fluid according to the invention. When rotation is completed the desirable high viscosity product 10 is being discharged from the top aperture 11, of cover 7, of the dispenser 8.

DESCRIPTION OF PREFERRED EMBODIMENTS

Figure 1:
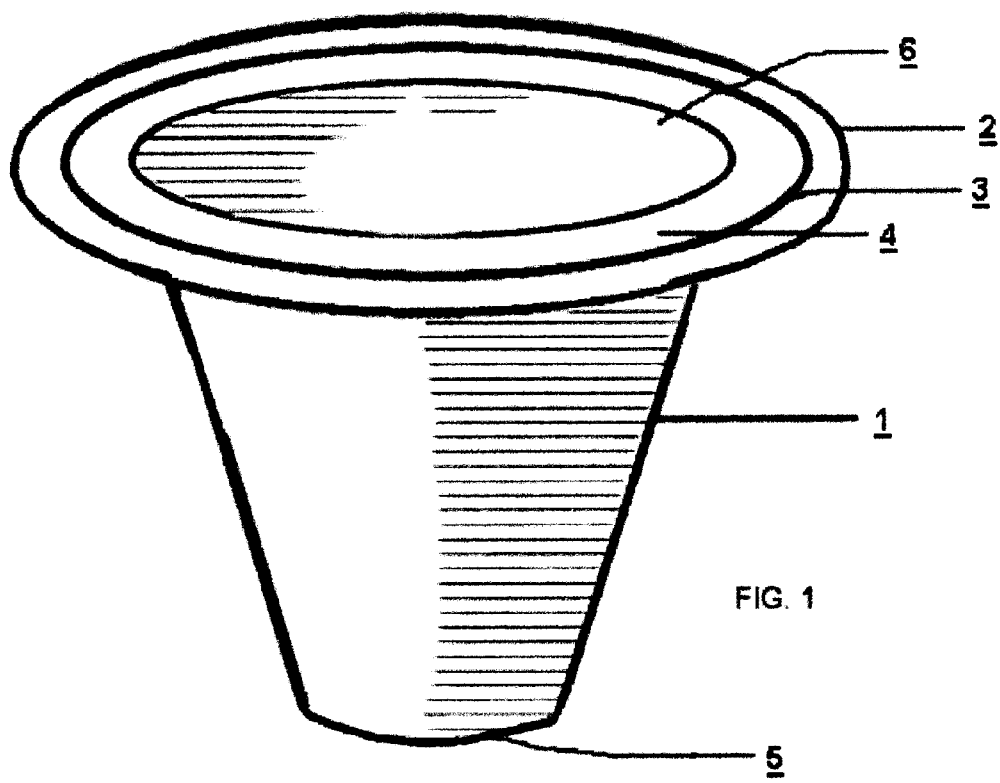
FIG. 1 is a vertical perspective side view of the embodiment device 1 according to the invention. Device 1 would preferably be manufactured from washable and food-safe plastic; however, other materials would also be suitable including metal, e.g. aluminum or stainless steel. Plastic material is the most economical.

Referring to the drawings, this device 1 as shown in FIG. 1, has a hollow conical shape with a flat rounded top. The device 1 may be integrated into the cover 7 of the dispenser 8 when manufactured as illustrated in FIG. 7 or FIG. 8.

The device 1 may be comprised of any suitable plastic, metal or other material having suitable strength and physical properties to withstand pressure while dispenser is being compressed. Material should have rigidity for it to maintain its shape in normal usage and suitable formability so that it can be readily shaped into its configuration as shown in the drawings. A preferred material for the device is a washable and food-safe plastic. Material requirements are that it be impermeable and compatible to the fluids being dispensed. When used in squeezable containers plastics are commercially attractive such as polyethylene, either high or low density. These plastics are relatively fluid impermeable, chemically inert and do not result in any undesirable taste or small contamination of the dispensed products are non-toxic.

Figure 2:
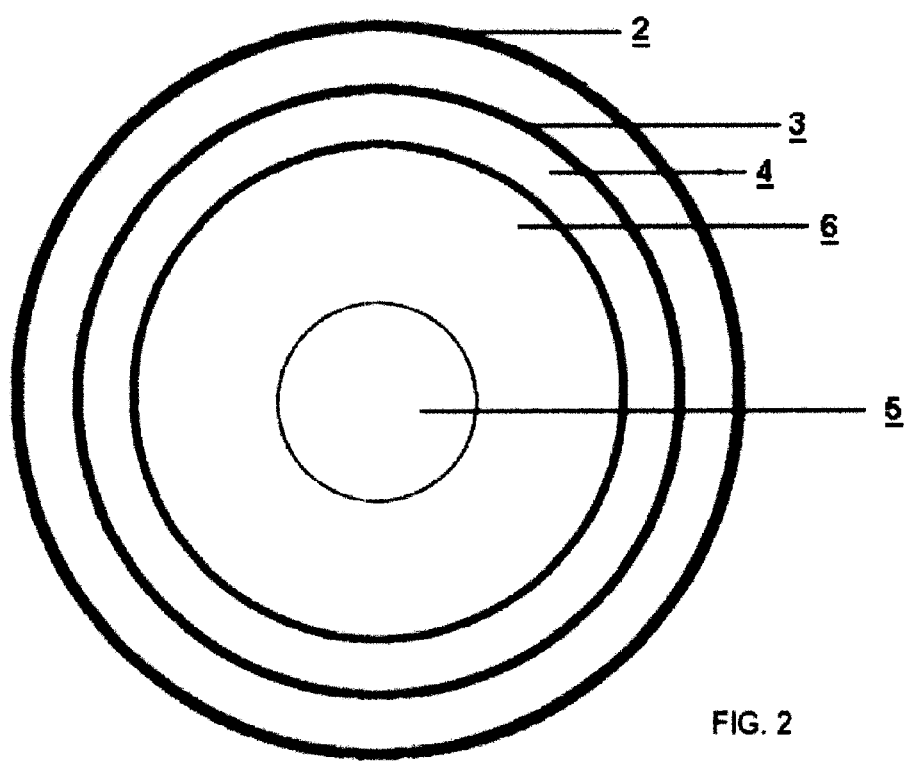
FIG. 2 is a top plan view of FIG. 1 (or a bottom plan view since they are essentially the same) of the device 1, showing all sections according to the invention prior to insertion into the dispenser.

The device 1 has a larger end 2 that covers the dispenser aperture opening 12. The device 1 smaller dimension aperture 5 at the end of the device 1 is preferably at least equal to the aperture opening 11 of the cover or can adjust to smaller size when needed. Size may need to be adjusted if clogging occurs. The exterior of the device 1 should be smooth to help gravity flow of fluid back into the dispenser 8 after it is used. On the device 1 there is a snap away piece 3 that would make the device 1 useable in different size bottles. Snap away piece 3 may be more than 1 section. Located on the top, circular top portion of the device 1 and can be left attached if top 12 of dispenser 8 is the same size. The cover 7 may be conical or flat have a smooth, mottled, striated or roughened surface. Dispenser 8 can be manufactured in any shape. FIG. 2 shows plan view of the device 1.

As shown in FIG. 3 and 4 are various different covers 7 with device 1 attached. FIG. 5 is an example of a typical dispenser 8 with device inserted into rim of dispenser 12. Device may have a breakaway section 3 included in the outside top flat portion of the device 1 and can be added to the device 1 if deemed necessary.

In operation, FIG. 6, FIG. 7, FIG. 8 and FIG. 9 is an perspective operational view of the embodiment of the device 1 which demonstrates the separation of fluid 9, low viscosity fluid from fluid 10, high viscosity fluid while the dispenser 8 is inverted. Low weight fluid 9 will flow down around cone shape and will be retained by space between dispenser 8 and device 1. The device 1 is functioning as stated in the patent and in FIG. 9 is demonstrating the expulsion of the high viscosity fluid 10. Example would be ketchup releasing from dispenser leaving behind water. The container aperture 2 is typical of those presently being used but may vary from one manufacturer and can be adjusted by breakaway section 3.

Figure 10:
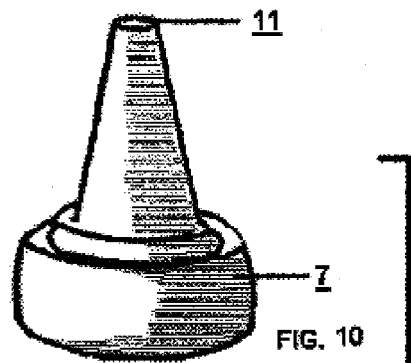
FIG. 10 is a perspective view of cover 7 of the dispenser 8 showing top aperture 11 of cover 7.
Figure 11:
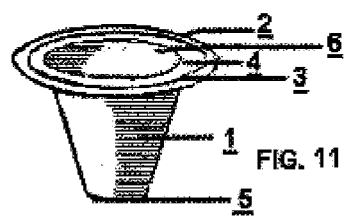
FIG. 11 is a perspective view of the embodiment of the device 1 including all sections.
Figure 12:
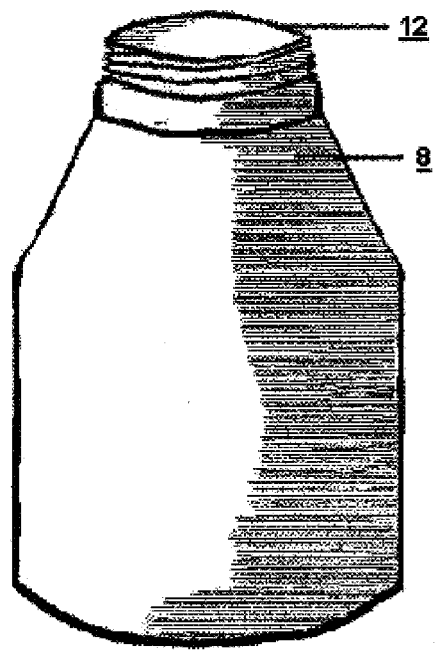
FIG. 12 is a perspective view of the dispenser 8 showing top rim 12.
Figure 13:
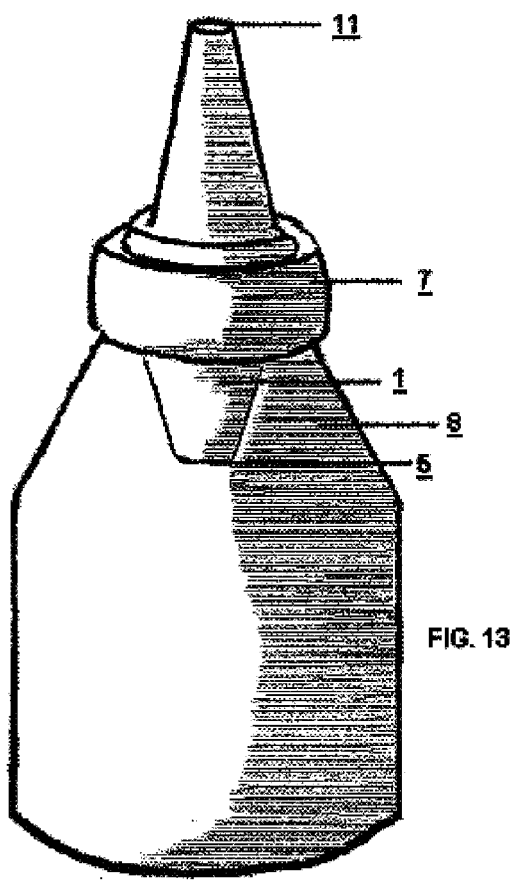
FIG. 13 is the full embodiment perspective view of dispenser 8 constructed with the cover 7 including device 1.

Referring to the drawings, the device as shown in FIG. 10, 11 and FIG. 12 is a perspective exploded representation view according to the invention. Dimensions of the device 1 may vary allowing utilization of this device 1 by any shape or size dispenser 8. The embodiment of a conical shaped cover 7 that illustrates the conical shaped separating device 1 and where it is inserted, according to the invention.

It will be appreciated that modifications of the structure discloses herein for purpose of illustration may be readily made by those skilled in the art without departing from the spirit of the invention. Applicant's invention is not to be limited by the specifics of the embodiments by the claim appended hereto. Low viscosity fluid would be for all purposes be considered a lighter weight fluid 9 that collects and separates on top of a heavier weight high viscosity fluid 10. Experienced personnel who work in dispenser 8 designs will understand that these principles and/or ideas can be used in various embodiments that may differ from embodiments that are illustrated.

In consistency with patent statues, a best and preferred embodiments is presented. The capacity of the patent protection sought is not limited solely to the illustrative embodiments but also to include all additional claims. This device develops certain principle and/or ideas that are included in the claims added hereto.

What is claimed is:

1. A method for separating a lower viscosity fluid from a higher viscosity fluid in a condiment dispenser, said condiment dispenser including a cover and a container, said method comprising the steps of:

installing a conical device open at both ends and having at least one break away section included in an outside top flat portion extending from an end of said conical device having a larger diameter, between said cover and said container with a smaller diameter portion of the conical device extending into said container; and inverting said dispenser wherein, under the influence of gravity, said lower viscosity fluid flows to, and is retained in an annular space between an impermeable wall of said conical device and a wall of said container, and said higher viscosity fluid passes through said conical device and out through said cover.

2. A method as recited in claim 1, wherein the lower viscosity fluid is water, and the higher viscosity fluid is ketchup or mustard.

3. A method as recited in claim 1, wherein said conical device permits undispensed higher viscosity fluid to flow back into said container.

4. In a condiment dispenser including a cover and a container, the improvement comprising:

a conical device open at both ends and having at least one break away section included in an outside top flat portion extending from an end of said conical device having a larger diameter, said conical device being situated between said cover and said container with a smaller diameter portion of the conical device extending into said container, wherein, upon inversion, and under the influence of gravity, a lower viscosity fluid contained within said container flows to, and is retained in an annular space between an impermeable wall of said conical device and a wall of said container, and a higher viscosity fluid contained within said container passes through said conical device and out through said cover, said at least one break away section enables said conical device to be fitted into various sized dispensers.

5. The condiment dispenser of claim 4, wherein said conical device is integrally molded as part of the container.

6. The condiment dispenser of claim 4, wherein said conical device is integrally molded as part of the cover.

7. The condiment dispenser of claim 4, wherein said conical device is composed of a washable and food-safe plastic.

8. The condiment dispenser of claim 4, wherein said conical device is composed of polyethylene.

* * * * *